United States Patent [19]

Schaeffer

[11] 4,144,620

[45] Mar. 20, 1979

[54] LINE TENSIONING APPARATUS AND METHOD

[76] Inventor: Daniel M. Schaeffer, 14 Elkin Dr., Middle Island, N.Y. 11953

[21] Appl. No.: 825,180

[22] Filed: Aug. 17, 1977

[51] Int. Cl.² .................... A44B 21/00; B21F 1/02
[52] U.S. Cl. .................................................. 24/71.3
[58] Field of Search ............... 24/68 R, 68 D, 71.3, 24/132 CL, 132 LP, 132 WA, 19, 115 R, 269, 273; 256/37; 211/119.15; 140/147

[56] References Cited

U.S. PATENT DOCUMENTS

| 3,021,580 | 2/1962 | Rowitz | 24/71.3 |
| 3,568,261 | 3/1971 | Korb | 24/71.3 |
| 3,879,805 | 4/1975 | Gretter | 24/71.3 |

Primary Examiner—Louis Rimrodt

[57] ABSTRACT

Interchangable line tensioning by bending or folding of a pre-strung line as well as a line having an accessible working end is taught by the method of this invention which advantageously uses apparatus embodied in a non-captive, unitary, passive line tensioning apparatus to shorten line by selectively engaging the line with three engaging members in a spaced-apart triangular array. The three engaging members are selected from a plurality of spaced-apart, selectively-engagable engaging members so as to provide a desired amount of tensioning when the engaged line forms a releasable sigmoid bend secured against accidental detensioning. A removably-captive embodiment of the line tensioner is also disclosed.

11 Claims, 8 Drawing Figures

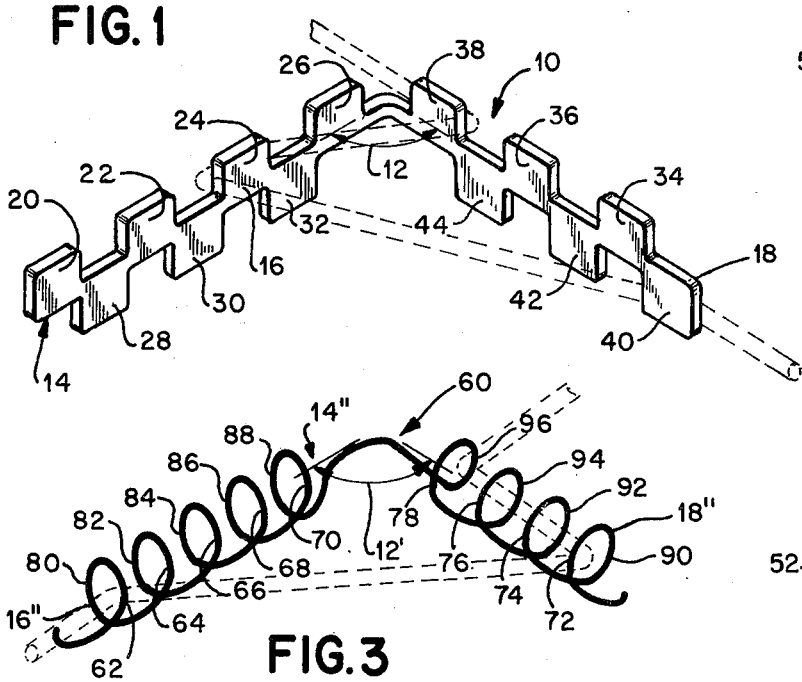
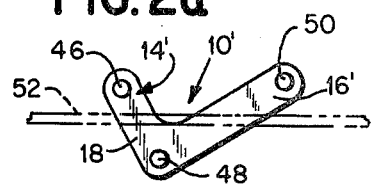
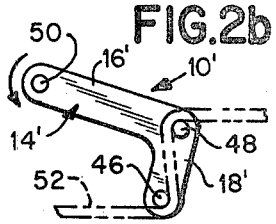
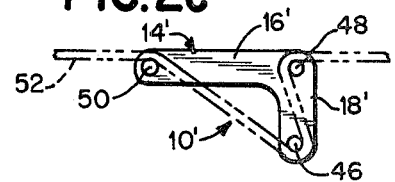
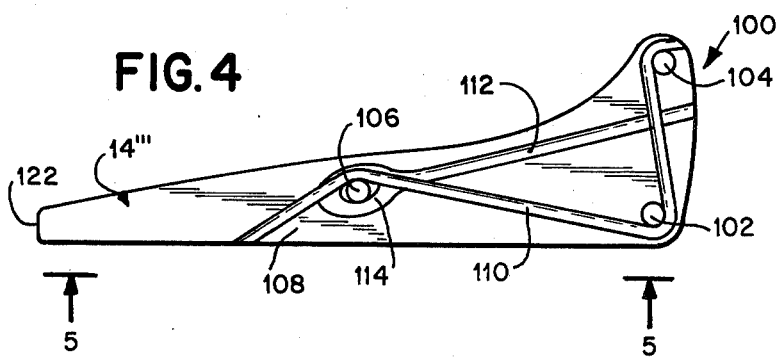
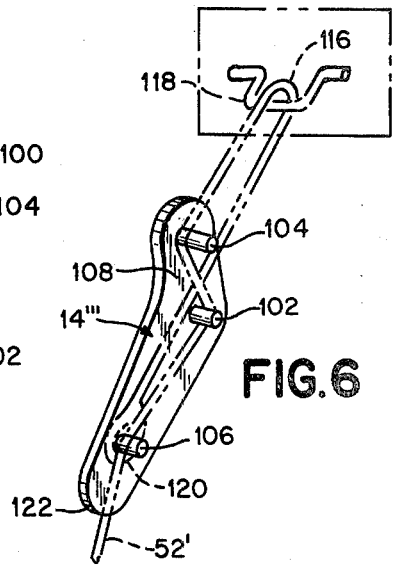
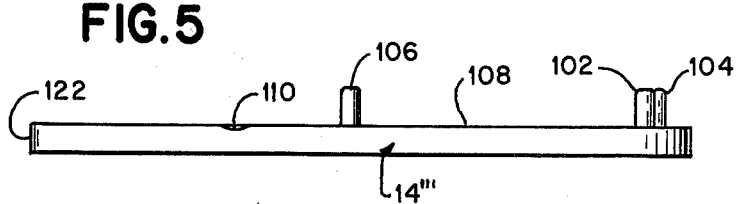

LINE TENSIONING APPARATUS AND METHOD

BACKGROUND OF THE INVENTION

Outdoor and camping activities are increasingly attracting a growing number of enthusiastic neophytes with little or no knowledge, training, or skill in the proper use of knots and hitches, and who, as a consequence, are unable to properly tighten the rope and line used to secure a bundle to an automobile roof-carrier, or to hold a bedding roll on a pack frame, or to lash a tarpaulin, or to tie down a tent fly, or even to take the slack out of a clothes line strung between two trees. Although poles for clothes lines are old and there are some other expedients available for handling special situations, there exists no single, simple means that can be used for releasably tensioning the line in each of the enumerated applications. Shock cord, and spring-loaded hooks can be used for certain special applications, but neither one of these devices can be used interchangably as desired in each of the applications where it becomes necessary to take the slack out of a line.

What is needed is a releasable tensioner and a method for tensioning a slack line without recourse to prior reeving of a captive element thereon; a tensioner that does not require the use of complicated linkages and swivelling hooks and the like. Preferably, a releasable line tensioner for interchangable use in camping and other outdoor activities should be a unitary, passive device of rugged construction capable of manufacture by mass production at low unit cost. Ideally, in order to limit labor costs, such a device should be capable of manufacture by processes that avoid labor-intensive operations. Manufacture is desirable by molding or casting from metal or plastic.

A device of the type envisioned does not appear to be available in the market place at this time, nor is any equivalent device advertised in the catalogues of the leading merchants supplying the outdoor activity and camping trade.

Pertinent patent art touching on passive line tensioners presently known to the inventor consists of three U.S. Pat. Nos. 1,215,391; 1,586,174; and 3,252,189. The apparatus of each of the first two of the enumerated patents functions by winding a section of the line onto a reel. After a sufficient tensioning, the line is engaged with a member provided to prevent unwinding. The major difference between the two tensioners is that one is captive on the line, with the line passing through a radial opening in the hub of the reel, while the other is removably captive on the line, with the line releasably retained in a diametrically disposed slot in the reel by means of a spring member.

The device of U.S. Pat. No. 3,252,189 cannot operate to tension a pre-strung line. It is captively attached to one end of a line which is reeved through the tensioner to form a closed loop capable of being anchored. When the loop as well as the other end of the line is anchored, the size of the loop can be altered by slidably moving the tensioner along the line to take up slack. Final tensioning is then achieved by forming a bend in the line in a manner not too dissimilar to the winding method of the other two devices. Detensioning is prevented by engaging the line with a hook projecting from a lever arm.

Obviously, any captive device, such as two of these three, has restricted utility. The releasably captive feature of U.S. Pat. No. 1,215,391 does somewhat increase its range of utility. There is no provision for possible fine adjustment to a desired tension in either of the first two cited patents, since each device requires a half revolution of the reel for each single incremental increase in the tensioning. This incremental increase is not small, since the amount of line wound on the reel in a half revolution is equal to the circumference of the hub of the reel.

Despite the fact that any desired degree of tensioning can be obtained using the tensioner of U.S. Pat. No. 2,252,189, that device does have a restricted utility since it is also a captive device and cannot be used interchangably for tensioning a pre-strung line.

Thus, these prior art devices either lack the ability to make fine adjustments in tension or lack interchangability. What is required as an improved tensioner is a non-captive, passive unitary tensioner that combines the advantages of these patented tensioners without any of their disadvantages, so as to be capable of interchangable use in the tensioning of any line, pre-strung or otherwise, to any desired degree of tension.

SUMMARY OF THE INVENTION

These and other deficiencies of the prior art are remedied by my method which uses a unitary, passive line tensioning apparatus of my invention to take the slack out of the standing part of a strung line by increasing the path length during the forming and releasable maintaining of a sigmoid bend of selected size. In a first mode of the operation of my invention when it is required to tension a slack line that has previously been strung as desired, an accessible standing part being available between suitably secured ends, I form the requisite sigmoid bend by first positioning a section of the said standing part intermediate selected spaced-apart engaging members of a non-captive, passive tensioner of my invention, and, then by rotating the line tensioner around an axis of rotation which is substantially perpendicular to the said standing part until the said standing part is in contacting engagement with each of the said selected engaging members, forming a sigmoid bend which generates a first rotational couple in a first sense. After forming the said sigmoid bend, I bring another section of the standing part into urging contacting engagement with a selected third engaging member so as to generate a second rotational couple which exactly counter-balances the first said rotational couple, thereby releasably maintaining tension developed in the line by the formation of the sigmoid bend therein.

In a preferred embodiment of my invention, my line tensioner has a body supporting a plurality of selectively-engagable engaging members, the engaging members defining at least one triangular array. Such a line tensioner, of unitary, passive structure, without moving parts, is capable of selectively removing slack of various degrees of slackness up to a maximum amount which is determined only by the size of the largest triangular array presented by the engaging members.

Not only can the preferred embodiment of my invention be used in the described first mode of operation for the tensioning of a line in which both ends have been secured prior to the need for tensioning, but the same embodiment can be used interchangably in a second mode of operation for the initial tensioning as well as the subsequent tensioning of a line whose bitter end has been secured and a working end is available and accessible. In the second mode of operation for the tensioning of such a line, an anchored loop is first formed, as by engaging a loop in an anchored S-hook, or by passing the working end of the line around a fixed mounting, reeving through a grommet, extending through a D-ring and the like to form an anchored closed loop with the working end brought up substantially to a section of the standing part of the line. The working end is then secured to the tensioner of my invention, as by belaying, hitching, and tieing thereto, preferably to a one of said engaging members. After securing the working end, the remaining steps for the formation and maintenance of the sigmoid bend are the same as described for the first mode of operation. In this second mode, however, since the size of the anchored loop is adjustable for initial removal of slack, only three engaging members are necessary and sufficient for line tensioning independent of the dimensions of the triangular array, provided that there is a sufficient extent of standing part available to permit movement of the tensioner with attached working end far enough away from the anchored portion of the loop to take up the slack.

A more thorough and complete understanding of the working of my invention may be had by reference to the description of the preferred embodiments when taken together with the appended drawing.

BRIEF DESCRIPTION OF THE DRAWING

FIG. 1 is a perspective view of a preferred embodiment of my line tensioner which can be molded in rigid thermoplastic polymer and heat bent to final form.

FIG. 2a is a schematic plan view illustrating the initial step in a preferred first mode of operation in the practice of my invention wherein the standing part of a strung line is positioned intermediate selected spaced-apart engaging members of a line tensioner according to my invention.

FIG. 2b is a schematic plan view of the line tensioner of FIG. 2a during the step immediately following the initial step.

FIG. 2c is a schematic plan view of the line tensioner of FIG. 2a after completion of the final step of the operation begun in FIG. 2a.

FIG. 3 is a perspective view of another preferred embodiment of my line tensioner which can be made of metal by recognized low-cost forming methods.

FIG. 4 is a plan view of a still further embodiment of my line tensioner which has specific utility in a preferred second mode of operation of my invention, and which can be made from metal or synthetic plastic by simple molding methods.

FIG. 5 is a view of the tensioner of FIG. 4 taken along line 5—5.

FIG. 6 is a perspective view of a line tensioner such as the embodiment of FIG. 4 in use in the preferred second mode of operation after the final step of forming and maintaining a selected sigmoid bend in the standing part of a line.

DESCRIPTION OF THE PREFERRED EMBODIMENTS

Referring now to the various figures of the drawing, where like reference characters refer to like elements, in FIG. 1 reference symbol 10 represents a preferred embodiment of the line tensioner of my invention which can be made of rigid plastic as by molding and then heat bending so as to form dihedral angle 12 in body member 14, said body member comprising a first leg 16 and a second leg 18. Each of the legs supports a plurality of engaging members in the form of spaced protrusions. Thus, leg 16 has upper engaging members 20, 22, 24, and 26 as well as lower engaging members 28, 30, and 32. Each lower engaging member is preferably located as shown intermediate the projections of the adjacent upper engaging members. Similarly, leg 18 has a set of upper engaging members 34, 36, and 38 along with corresponding lower engaging members 40, 42, and 44. The size and shape of the engaging member is not particularly critical provided that it can function to engage a section of line and withstand the stresses of the tensioning operation. Nor is the number of engaging members critically limiting so long as a minimum of at least 3 engaging members form a triangular array sufficient for the formation and maintenance of the desired sigmoid bend. The actual number of engaging members shown in the drawing of FIG. 1 has certain advantages, as will be described below. It will be appreciated by those skilled in the art that leg 16 and leg 18 can be of any practical length, with one leg preferably longer than the other so that the longer leg can be used as a lever during the operation of the invention, as will be explained hereinafter. Similarly, it will be obvious to those skilled in the art that the spacing between adjacent engaging members does not have to be regular as shown, nor does the spacing have to be as close as illustrated, although a close and regular spacing does have certain advantages which will become apparent later. The minimum limiting dimension for the spacing of two adjacent engaging members is that dimension which permits a line of the desired size to fit therein. The maximum spacing between adjacent engaging members is limited only by the length of the leg from which they protrude. The design and layout of the embodiment depicted in FIG. 1 is particularly preferred because it is economical of space and material and it permits the user to select from a wide range of options having fine increments in path length difference so as to accommodate a wide variation in the amount of slack that can be removed during the tensioning of a line to a desired tension.

Also, as will be appreciated by those skilled in the art, dihedral angle 12 can have a wide range of openings, can be either acute or obtuse, and is limited only by certain practical considerations: the angle must be substantially different from zero since a dihedral angle of less than about thirty degrees is wasteful of material because the sections of the legs adjacent to the dihedral angle are too close together to be useful in forming a triangular array of engaging members; the angle must be substantially different from one-hundred and eighty degrees since one cannot construct a triangular array if the engaging members are all on a straight line and there must be some angle so that a line of desired diameter can form a sigmoid bend by engagement with selected engaging members.

The method of operation in the first mode of the practice of my invention is best explained by reference to the sequence of schematic drawings, FIG. 2a, FIG. 2b, and FIG. 2c. For the purpose of describing the steps of the method of my invention, 10' represents, in plan view, a simplified schematic line tensioning apparatus according to the teaching of my invention. Shown schematically is a body member 14', of two unequal length legs 16' and 18', the legs meeting at a right angle and having the preselected engaging members 46, 48, and 50, positioned in a right-triangular array, with 52 representing the accessible portion of the standing part of a line whose opposite ends, not shown, are secured to fixed mountings.

The following definitions are provided to permit a better and clearer understanding of the description which follows in an effort to limit possible misunderstanding and confusion as to the precise meaning of the words employed. Throughout this specification the term "line" includes wire or fiber rope, chain, cable, wire and similar elongated flexible lines used for lashing tackle, mast stays, tent guys, tarpaulin lashing and tie-downs, as well as clothes lines and the like. Generally, in the use of such lines a secured inaccessible end is called the "bitter" end. The opposite end, which can be manipulated, is termed the "working" end. The line between these two ends is designated the "standing part". A "bight" is any non-straight section in the standing part. A "loop" is a bight that forms at least a half circle. Bringing the opposite sides of a loop near each other forms a "closed" loop. An "eye" is a closed loop made in a line and secured either by knotting or by more permanent means.

Refer now to FIG. 2a which shows schematically the step in the practice of the first mode of the method of my invention wherein standing part 52 and line tensioner 10' are positioned in relationship one with the other so that standing part 52 is positioned intermediate selectively-engagable engaging members 46 and 48. In the next step, shown in FIG. 2b, line tensioner 10' is rotated in the direction of the curved arrow around an axis substantially perpendicular to standing part 52. When the rotation of tensioner 10' has progressed to the state depicted in FIG. 2b, standing part 52 has been brought into contacting engagement with engaging member 46 and with engaging member 48, and standing part 52 has been deformed to produce a sigmoid bend. Therefore, in this example, the selected engaging members 46 and 48, when taken together, constitute a means for rotationally engaging a section of standing part 52. As a consequence of the formation of the sigmoid bend, the path length traversed by the standing part has been increased, thereby removing slack and producing longitudinal tension in the oppositely-extending segments of standing part 52. This longitudinal tension generates a first rotational couple on tensioner 10' in the opposite rotational sense to the direction indicated by the curved arrow.

A further continuation of the rotation of body member 14' in the direction of the curved arrow, leg 16' being used advantageously as a lever for ease of manipulation, increases the longitudinal tension in standing part 52. Rotation is continued to the point where engaging member 50 can be, and is, brought into contacting engagement with standing part 52, as shown in FIG. 2c. Standing part 52 can be brought into rotational engagement with engaging member 50 by slightly deflecting standing part 52 perpendicularly to the plane of the tensioning so as to pass over the exposed end of engaging member 50, from one side thereof to the other, until standing part 52 is in contacting engagement therewith and generating a second rotational couple on tensioner 10' in the rotational sense of the curved arrow of FIG. 2b. This second rotational couple exactly counterbalances the previously generated first rotational couple, thereby securing the tensioned line against accidental detensioning.

Since the tensioned line and the line tensioner shown in FIG. 2c are in a stable configuration, in static equilibrium with all forces in balance, it can be demonstrated readily that for any possible different triangular arrays and spacing of the selected engaging members 46, 48, and 50, the sigmoid bend formed in the standing part 52 will always closely follow two sides of the triangular array. The third side of the triangle, the open side, which I call the base, is, for all practical purposes, aligned parallel with the two oppositely-extending sections of the standing part, which sections extend beyond the engaging members defining the base of the triangle.

In the light of my teaching, it will now become apparent to those skilled in the art that even such simplified line tensioners of my invention as 10' of FIG. 2a have the capacity to accommodate for variations in amount of slack. For example, referring to the configuration shown in FIG. 2c, the line tensioner can be engaged with standing part 52 in two additional ways, not shown, in which the path traversed by the sigmoid bend is different from the one illustrated. Not only can the sigmoid bend pass from 48 to 50 by way of 46, as shown, but it can go from 46 to 48 by way of 50, or, from 50 to 46 by way of 48. Thus, if each side of the triangular array defined by 46, 48, and 50 has a different length, tensioner 10' has the capability of interchangable shortening of strung lines having three different amounts of slack.

Further, it can be shown to a first order to approximation, that, for any selected path taken by the sigmoid bend, the resulting shortening, which is equal to the increase in path length, is substantially equal to the included perimeter of the selected triangle minus the length of the base of the triangle. It is possible to substitute numbers to gain an appreciation of the differences in path length. Thus, assume that the sides of the triangle of the example of FIG. 2c have dimensions of 3 units, 4 units, and 5 units, a right-triangle, it then follows that the amount of shortening for the three possible paths is 2 units, 4 units, and 6 units, a three-fold variation in the amount of slack that can be compensated for.

Those skilled in the art will appreciate that it would be extremely fortuitous to find that a simple tensioner having an arbitrarily-spaced single triangular array of engaging members satisfactorily tensioned a particular pre-strung line, despite the capability of the tensioner to interchangably tension lines having three different amounts of slack. Therefore, in accord with the teachings of my invention, it becomes obvious to provide means for selectively sizing the triangular array so as to compensate for the exact amount of slack encountered. Such selective sizing of the triangular array of engaging members can, of course, be accomplished using known movable elements in a wide variety of ways known to artisans and engineers.

However, instead of the obvious use of movable elements, I prefer to provide the same facility for selectively sizing the triangular array of engaging members through the use of a passive device, without moving parts, as illustrated in the embodiment of FIG. 1. My solution is to provide a plurality of spaced-apart, selectively-engagable engaging members at a spacing and in a number sufficient to allow for a plurality of small incremental changes in path length. As an example, in FIG. 1, the path between engaging member 40 and engaging member 38 may be traversed via any selected one of the seven engaging members on leg 16. It should be noted, that since these different paths all have the same base length, the longest path will be for the triangular array whose angle opposite the base is the most acute. Therefore, each of the seven path lengths will be different and capable of accommodating a different amount of slack. Since leg 18 also has a plurality of engaging members, the number of optional paths having different path lengths is greatly increased and almost any amount of slack, within the limits imposed by size of the tensioner, can be taken care of after a few trials, using tentation. Tentation having the usual dictionary defined meaning, which I take to mean working by successive trials. The amount of slack that can be taken care of, of course, is limited only by the face that leg 16 and leg 18 cannot be made infinitely long and must terminate at some practical length.

Now, having described the presently preferred embodiment of FIG. 1, and its method of operation in a first preferred mode of line tensioning, and since the shape, number, dimensional configuration, and inter-member spacing of the selectively-engagable engaging members is not critical, provided a triangular array is present, it will be apparent to those skilled in the art that other configurations can be conceived that will be the functional equivalent of my presently preferred embodiment. Although the embodiment of FIG. 1 was originally conceived for use in camping and other outdoor activities, and was, therefore, designed so as to facilitate manufacture in metal or plastic by mass-production molding, other equally well known methods of manufacture, including extrusion, stamping, cold-rolling, hot-rolling, forging, machining and welding can be used, alone or in combination, to produce line tensioners in the spirit of my invention for other uses including industrial uses. Some artisans may prefer to make a line tensioner of wood, or of ceramic, or of twisted wire. Others may even decide, in the light of my teaching, to make a line tensioner by driving nails into wood. It is equally possible to excecute an artistic version of my line tensioner in skeleton outline form, or, in the form of a tetrahedron with appropriate projections at each corner.

I consider all of the above to be obvious from the teaching of the invention to this point in the specification. But, what I do not consider to be obvious, is that the embodiment illustrated in FIG. 3 is the functional equivalent of the embodiment of FIG. 1 with the added inherent advantage that it can also be used as a removably-captive line tensioner if so desired.

FIG. 3 shows a line tensioner 60 of metal of suitable rigidity to stand the stress of use without deformation, formed as by hot-bending and the like, wherein body member 14" has a first leg 16" and a second leg 18" meeting at a dihedral angle 12'. Each leg of leg 16" and leg 18" is in the form of a helix whose adjacent turns are spaced apart a distance sufficient to allow for ready passage therebetween of a line of suitable diameter. Now, it should be understood that a not readily apparent nor well known topological property of the helix makes it a simple matter to position a helix on a strung line so that the line runs along th longitudinal axis of the helix. Of course, this positioning can be done without threading or reeving because the helix is not a closed figure. Therefore, since a line can be positioned so as to lie along a portion of the axis of either helix, the oppositely-disposed portions of the helix that are tangent to a plane parallel to a plane that defines one side of dihedral angle 12' each constitutes a one of a plurality of spaced-apart, selectively-engagable engaging members, and any two selected concave helix-elements constitutes a means for rotationally engaging a section of the standing part of a line. The drawing of FIG. 3 shows that leg 16" has spaced-apart, selectively-engagable engaging members 62, 64, 66, 68, and 70, as indicated, concave in one direction, with a corresponding set of engaging members, 80, 82, 84, 86, and 88 concave in the opposite direction. Similarly, leg 18" has spaced-apart, selectively-engagable engaging members in two groups: 72, 74, 76, and 78, in one group; and 90, 92, 94, and 96, in the other group. The various paths that one can choose for a line to follow when this embodiment is used as a line tensioner in the first preferred mode of operation of my invention are not shown in the figure in order to avoid further possible confusion of the drawing. It is, however, perfectly feasible to trace the path mentally. As an example of one possible path for the sigmoid bend to follow, assume that the standing part enters from the right side of the drawing of FIG. 3, obliquely, along a path substantially parallel to one plane of the dihedral angle, the line engages with engaging member 96 and turns to follow the longitudinal axis of the helix of leg 18" until, after engaging with engaging member 72, bending and proceeding towards the left to engage with engaging member 62, where the line makes a final bend to follow its initial course, substantially parallel to the plane of the dihedral angle. It will be apparent, that when the standing part follows the path just described, line tensioner 60 becomes removably-captive on the standing part of the line. The possibility of a large number of additional paths is immediately apparent, as from 88, via 66, to 74, or from 70, via 74, to 66, and many others. In each instance the standing part successively engages with the concave sides of the selected engaging members which are arranged in a triangular array in the plane of the tensioning. Since, as with the embodiment of FIG. 1, each of the possible paths has a different path length, the utility of this embodiment of my invention is immediately apparent.

Thus far, I have described a preferred first mode of operation of the line tensioner of my invention in which my line tensioner is used to tension a pre-strung line. I will, now, describe a preferred second mode of operation which is most advantageously used with a line whose working end has not been secured and is available and accessible. This preferred second mode of operation is illustrated in the perspective drawing of FIG. 6, where the illustrated line tensioner of my invention for this application has an elongated body member 14''' supporting a triangular array of engaging members in the form of posts, 102, 104, and 106, arising from a planar surface 108. Standing part 52' of a line, whose anchored bitter end is not shown, has been tensioned by first attaching the working end of the line to the line tensioner prior to initiation of the steps of engaging and forming the sigmoid bend, as described and illustrated in the sequence of FIG. 2a, FIG. 2b, and FIG. 2c. As illustrated in FIG. 6, a closed loop 116 in standing part 52' is anchored by passing the working end around a fixed mounting 118 with the working end brought back close to and substantially parallel to the standing part. The working end is then secured to the line tensioner, as in the illustration, by slipping a previously formed eye 120 at the working end over engaging member 106, in encirclement therewith. If so desired, eye 120 can be made to engage with either one of the other engaging members, or, if it has a sufficiently large opening, eye 120 can be slipped over end 122, end 122 having been tapered for this purpose as well as to serve as a convenient lever handle during the tensioning operation. Alternatively, the working end can be suitably fastened to any one of the engaging members or to the body of the tensioner by knotting or hitching, as is known in the art. However, I preferably attach the working end to engaging member 106, when both sides of the anchored loop are substantially parallel, in order to have the external stresses acting on the tensioner operate along a single axis. If the working end approaches the standing part at a substantial angle, I preferably attach the working end to body member 14''' in the region of end 122.

FIG. 4 is a plan view of the tensioner just described which is most advantageously used in this second mode of tensioning although it does have utility in the first mode, also. Tensioner 100 has its engaging members, 102, 104, and 106, in a triangular array, as shown, with engaging members 102 and 104 closer to a first end of an elongated body 14''' whose opposite end 122 is tapered and extended, for the reasons heretofore given. For ease in manufacture by the chosen method of molding, engaging members 102, 104, and 106 are substantially perpendicular to planar surface 108, which surface carries an intaglio pattern, indicated by 110, 112, and 114, of a preferred arrangement for the location of the various sections of the standing part and the working end when this embodiment is used for the tensioning of a line according to the practice of the preferred second mode of my invention. As explained above, in the discussion of the preferred first mode of operation, the sigmoid bend can be made to follow a path other than that suggested by the intaglio pattern without departing from the spirit of my invention. FIG. 5, the view of FIG. 4 taken along sight line 5—5, shows the uncomplicated profile of the line tensioner 100 which permits it to be made in a single operation by molding. If other methods of manufacture were deemed preferable to molding for any reason, then it would be obvious to modify the design of engaging members 102, 104, and 106 so that at least a portion of the engaging surface of each engaging member was at an oblique angle to surface 108 to function therewith as a trap for the engaged section of the standing part during use of the tensioner.

Having now described and illustrated with a presently preferred embodiment the preferred second mode of operation of the method of my invention, it should now be apparent to those skilled in the art that the preferred embodiments of FIG. 1 and FIG. 3 can also be used in this second mode of operation with the same facility as when used in the first mode of operation. The working end of an anchored closed loop can be readily secured to line tensioner 10 or to line tensioner 60 in many ways known to those skilled in the art, as, by knotting, belaying, and hitching, either to an individual selected engaging member, to several engaging members, or, to the body of the tensioner, which body can be modified, if desired, to provide a specific point of attachment, although I do not believe any significant advantage can be gained thereby if the tensioner is to be used interchangably in a variety of different situations. In any event, I prefer to attach the working end to the body of the tensioner in a way such that the working end is in substantially parallel alignment with those extended sections of the standing part which lie outside the sigmoid bend.

Although this invention was conceived as a method and device for interchangable use in outdoor and camping activities, it will be obvious to those skilled in the art that this invention can also have significant industrial application, especially when used in the second mode, to lash and tie down heavy loads during transit. Therefore, it should be noted, it becomes a simple matter to design an industrial tensioner for a specific application using wire rope or cable, the individual wire elements making up the cable being subject to permanent set and kinking if the line is bent around a radius less than a critical value. As shown in FIG. 2c and in FIG. 6, the tensioner and line are in a stable configuration. All of the bending angles can be determined for this condition once the path of the sigmoid bend between the three selected engaging members is known. As an example, using the configuration of FIG. 2c, the bending angle at engaging member 46 is the angle at this apex of the triangle. At each of the other engaging members the bending angle, for all practical purposes, is one-hundred and eighty degrees minus the value of the contiguous base angle.

Having described with candor the invention and its manner of use with presently preferred embodiments as exemplars, as required by the statute, it will be understood that innumerable variations can be made in the same without deviating from the teaching of my invention nor departing from the scope of the appended claims, wherein I claim:

1. In a method of releasably tensioning line, in which a final tensioning is achieved by bending or folding a section of the standing part of said line after the working end is made fast, said line fastened at the bitter end and strung as may be required so that a said standing part is accessible, the improvement comprising tentation which includes at the final steps:

positioning a first section of said standing part between a first selected engaging member and a second selected engaging member of a plurality of spaced-apart, selectively-engagable engaging members of a passive, unitary line tensioner;

rotating said line tensioner in a first rotational sense around a rotational axis substantially perpendicular to said standing part until said standing part is in contacting engagement with both said first selected engaging member and said second selected engaging member and said standing part forms a sigmoid bend generating a first rotational couple in a first sense;

and, then bringing a third selected engaging member of said line tensioner into contacting engagement with a second section of said standing part in rotational engagement in a second rotational sense around said axis, said contacting engagement generating a second rotational couple exactly counterbalancing said first couple, said first selected engaging member, said second selected engaging member, and said third selected engaging member defining a spaced-apart triangular array, whereby said line is releasably tensioned against accidental detensioning.

2. The method of claim 1 wherein, prior to the step of positioning, said working end is made fast to said line tensioner with said working end and said standing part forming an anchored loop.

3. The method of claim 2 wherein said working end is made fast to any said selected engaging member.

4. A line tensioner for releasably tensioning a line, said line strung as may be required, secured at its opposite ends and having an accessible standing part, said line tensioner comprising:

means for engaging a first section of said standing part to generate a first couple in a first sense around an axis, said means for engaging comprising a plurality of spaced-apart, selectively-engagable engaging members;

and, means, comprising at least a third engaging member, for contacting a second section of said standing part in engagement to selectively generate a second couple exactly counterbalancing said first couple, said third engaging member together with said selectively-engagable engaging members defining a triangular array.

5. The invention of claim 4 wherein said line tensioner includes means for securing the working end of said line.

6. The invention of claim 5 wherein said line tensioner has no movable parts.

7. The invention of claim 6 wherein said line tensioner is of a unitary structure.

8. The invention of claim 7 wherein said line tensioner includes means for making the said line tensioner removably-captive on said standing part.

9. The invention of claim 7 wherein said unitary structure is an integral molding preferably of metal or rigid plastic.

10. The invention of claim 9 wherein said plurality of spaced-apart, selectively engagable engaging members is two.

11. The invention of claim 10 wherein said unitary structure includes a planar surface bearing an intaglio pattern of a preferred location for said standing part and said working end in relation to said means for engaging and said means for contacting.

* * * * *